United States Patent

Otsuka

US005755076A

[11] Patent Number: 5,755,076
[45] Date of Patent: May 26, 1998

[54] HEAT SEALING BAR

[75] Inventor: Yuzo Otsuka, Tokyo, Japan

[73] Assignee: Tetra Laval Holdings & Finance S.A., Switzerland

[21] Appl. No.: 804,435

[22] Filed: Feb. 21, 1997

Related U.S. Application Data

[63] Continuation of Ser. No. 532,792, Oct. 17, 1995, abandoned.

[30] Foreign Application Priority Data

May 6, 1993 [JP] Japan ................................. 5-105383

[51] Int. Cl.⁶ ........................................................ B65B 51/10
[52] U.S. Cl. ............................ 53/373.7; 53/373.8; 53/550; 53/551
[58] Field of Search .............................. 53/373.7, 373.8, 53/550, 551, 554, 374.8; 219/425, 449, 460, 461

[56] References Cited

U.S. PATENT DOCUMENTS

| | | |
|---|---|---|
| 4,075,818 | 2/1978 | Wright et al. ................. 53/374.8 |
| 4,288,968 | 9/1981 | Seko et al. ................... 53/550 |
| 4,630,429 | 12/1986 | Christine .................... 53/551 |
| 4,949,846 | 8/1990 | Lakey ......................... 53/550 |
| 4,965,986 | 10/1990 | Klinkel ....................... 53/551 |
| 4,999,974 | 3/1991 | Kovacs et al. ................ 53/551 |
| 5,155,980 | 10/1992 | Mansson et al. .............. 53/551 |
| 5,206,484 | 4/1993 | Issartel ...................... 219/270 |
| 5,451,288 | 9/1995 | Smith et al. ................. 156/359 |

FOREIGN PATENT DOCUMENTS

9108954  6/1991  WIPO.

OTHER PUBLICATIONS

Patent Abstracts of Japan, vol. 17, No. 212, 26 Apr. 1993.

Primary Examiner—James F. Coan
Assistant Examiner—Gene L. Kim
Attorney, Agent, or Firm—Lorusso & Loud

[57] ABSTRACT

There is provided a heat sealing bar (19) having a heating ribbon (35) which endures repeated sealing operations. The heat sealing bar comprises a slender block-like bar body (31), an insulating layer (33) formed on the surface of the bar body (31), and a heating ribbon (35) fixed on the insulating layer (33). A heat pipe (41) is embedded in the bar body (31) along the heating ribbon (35). The heat pipe (41) transfers heat in the longitudinal direction of the heat sealing bar (19) from a portion of a small thermal load to a portion of a larger thermal load, thereby holding the entirety of the heat sealing bar uniform in temperature. Accordingly, the opposite ends and central portion of the heating ribbon (35) fall in a stationary state in the same temperature range as that for the rest of the heating ribbon. As a result, the heating ribbon (35) expands uniformly over the entirety thereof, and there never occurs the phenomenon of an inconsistency in expansion between the heating ribbons (35) and the insulating layer (33).

4 Claims, 4 Drawing Sheets

HEAT SEALING BAR

This application is a continuation of application Ser. No. 08/532,792, filed Oct. 17, 1995, now abandoned.

TECHNICAL FIELD

The present invention relates to a heat sealing bar.

BACKGROUND ART

In a conventional process for manufacturing a container for drinks such as milk and soft drinks, a web-like packaging material made of a flexible laminated material is supplied to an apparatus for filling. In the apparatus, the packaging material is formed into a tube, to which drink is filled and then cut into a brick-like container.

In more detail, the apparatus for filling seals the web-like packaging material in the longitudinal direction to form a tube, and continuously feeds the tube downward. While the tube is fed downward, drink is filled into the tube from above. Then, the tube is held at opposite walls thereof by a sealing/cutting unit and sealed in the lateral or transverse direction of the tube at predetermined intervals.

Subsequently, a laterally sealed portion is cut to form a plurality of rectangular containers containing a predetermined amount of drink therein, thereby completing the manufacture of containers filled with drink.

Incidentally, the sealing/cutting unit urges a cutting jaw and a heat sealing jaw to sandwich the tube for squeezing, thereby bringing opposing inner surfaces of the tube packaging material in contact with each other.

Then, the sealing/cutting unit moves downward while squeezing the tube. During the downward movement, a heat sealing bar disposed at the forward end of the heat sealing jaw and a cutting bar disposed at the forward end of the cutting jaw strongly press a portion to be laterally sealed, and the heat sealing bar generates heat for sealing the portion laterally.

Next, the structure of the heat sealing bar will be described.

FIG. 1 is a perspective view showing a conventional heat sealing bar, and FIG. 2 is a cross-sectional view showing the conventional heat sealing bar.

In these drawings, the reference numeral 19 denotes a heat sealing bar; the reference numeral 31 denotes a slender block-like bar body made of metal; the reference numeral 33 denotes an insulating layer made of chromium oxide formed on the surface of the bar body 31; the reference numerals 34 and 35 denote heating ribbons fixed on the surface of the insulating layer 33; the reference numerals 37 and 38 denote holders to secure the end portions of the heating ribbons 34 and 35 onto the bar body 31 at the opposite ends of the heat sealing bar 19. The heating ribbons 34 and 35 are formed with a strip-like ribbon of 0.2 mm in thickness made of nickel alloy. Electric terminals 34a and 35a are formed at one end of heating ribbons 34 and 35, respectively, and the terminals 34a and 35a are connected to an unillustrated power source for supplying current in pulses to the heating ribbons 34 and 35. The heating ribbons 34 and 35 are connected to each other at another end thereof by an unillustrated conductor.

The heating ribbons 34 and 35 are fixed on the insulating layer 33 by diffusing metal atoms in the layer. In the case where the heating ribbons 34 and 35 are formed with a titanium-base activated metal and silver, the heating ribbons 34 and 35 can also be fixed on the insulating layer 33 by brazing.

After the heating ribbons 34 and 35 have been fixed on the insulating layer 33, the entirety thereof is coated with silicone for improving the corrosion resistance of the heating ribbons 34 and 35 and the property of separating the packaging material from the heat sealing bar. Moreover, a cooling water passage 39 is formed in the bar body 31 in the longitudinal direction thereof (in the lateral direction of the tube) for cooling the heat sealing bar 19.

However, in the conventional heat sealing bar 19, one pulse of current is supplied to the heating ribbons 34 and 35 for forming one sealed portion by fusing a film, and then another short pulse of current is supplied for separating the packaging material from the heat sealing bar 19; moreover, since each pulse is generated at intervals of 500 ms., the heating ribbons 34 and 35 are repeatedly heated and cooled, causing the life thereof to be shortened.

In detail, when one pulse of current is supplied to the heating ribbons 34 and 35, the surface temperature of the heating ribbons 34 and 35 is elevated to about 250° C. On the other hand, the temperature of the boundary portion between the insulating layer 33 and the bar body 31 is about 150° C.

Accordingly, the temperature difference mentioned above causes the phenomenon of an inconsistency in expansion between the heating ribbons 34 and 35 and the insulating layer 33. The recurrent occurrence of this distortion causes the heating ribbons 34 and 35 to fatigue and then break. When the heating ribbons 34 and 35 have both a portion bearing a thermal load and a portion not bearing a thermal load, the heating ribbons fatigue remarkably and hence, are more apt to break.

FIG. 3 is a schematic illustration of a conventional sealing/cutting unit.

In FIG. 3, the reference numeral 11 denotes a tube; the reference numeral 14 denotes a sealing/cutting unit; the reference numeral 18 denotes a cutting bar; the reference numeral 19 denotes a heat sealing bar; the reference numeral 31 denotes a bar body; the reference numeral 33 denotes an insulating layer; the reference numeral 35 denotes a heating ribbon; the reference numerals 37 and 38 denote holders to secure the end portions of the heating ribbon 35 onto the bar body 31 at the opposite ends of the heat sealing bar 19 the reference numeral 39 denotes a cooling water passage.

The heating ribbon 35 fixed on the bar body 31 extends substantially over the entirety of the bar body 31 in the longitudinal direction, and generates heat uniformly over the entire area of the heating ribbon 35. The width of the tube 11 flattened between the cutting bar 18 and the heat sealing bar 19 is smaller than the length of the heating ribbon 35. Therefore, since there is no heat transfer to the tube 11 at the opposite end portions A and C of the heating ribbon 35 where the tube 11 does not exist when the tube 11 is squeezed, the end portions remain at a higher temperature than the rest of the heating ribbon 35.

There exists a longitudinally sealed portion called LS portion (a portion formed by sealing the web-like packaging material in the longitudinal direction) at the center of the tube 11. The packaging material in the LS portion forms a 3-layer structure, and consequently, the 3-layer portion is thicker than the rest of the tube 11, and also is lower in thermal conductivity because of the presence of a film provided for improving the gas barrier property. As a result, a central portion B of the heating ribbon 35 transfers less heat to the tube 11 than the rest of the heating ribbon 35, and accordingly remains at a higher temperature than the rest of the heating ribbon 35.

3

As stated above, there exist three different kinds of thermal loads in the heating ribbon 35. A portion with a smaller thermal load expands more, causing the occurrence of the phenomenon of an inconsistency in expansion between the heating ribbon 35 and the insulating layer 33. The phenomenon of an inconsistency in expansion is intensive, particularly at the opposite ends A and C of the heating ribbon 35. This also applies to the heating ribbon 34 (FIG. 1).

An object of the present invention is to solve the above-mentioned problems involved in the conventional heat sealing bar, and to provide a heat sealing bar having heating ribbons which are not broken after repeated sealing operations.

DISCLOSURE OF THE INVENTION

According to the present invention, a heat sealing bar is disposed in a lateral direction with respect to a tube formed by sealing a web-like packaging material in a longitudinal direction, for sealing the tube in the lateral direction.

The heat sealing bar according to the present invention comprises a slender block-like bar body, an insulating layer formed on the surface of the bar body, a heating ribbon fixed on the surface of the insulating layer and supplied with current in pulses, and a heat pipe embedded in the bar body parallel the heating ribbon.

The heat pipe transfers heat in the longitudinal direction of the heat sealing bar from a portion of a small thermal load to a portion of a larger thermal load, thereby holding the entirety of the heat sealing bar uniform in temperature. In other words, a part of heat generated at the opposite ends and central portion of the heating ribbon moves to other portions of a larger thermal load.

Accordingly, the opposite ends and central portion of the heating ribbon fall remain in the same temperature range as that for the rest of the heating ribbon. Hence, the heating ribbon expands uniformly over the entirety thereof, and there never occurs the phenomenon of an inconsistency in expansion between the heating ribbon and the insulating layer. As a result, distortion in the insulating layer is prevented, and the heating ribbon is free from breakage caused by the recurrence of distortion.

In the present invention, the bar body may be made of metal, the insulating layer may be made of chromium oxide, and the heating ribbon may be made of nickel alloy.

BEST MODE FOR CARRYING OUT THE INVENTION

An embodiment of the present invention will hereinafter be described in detail with reference to the drawings.

Figure 4:
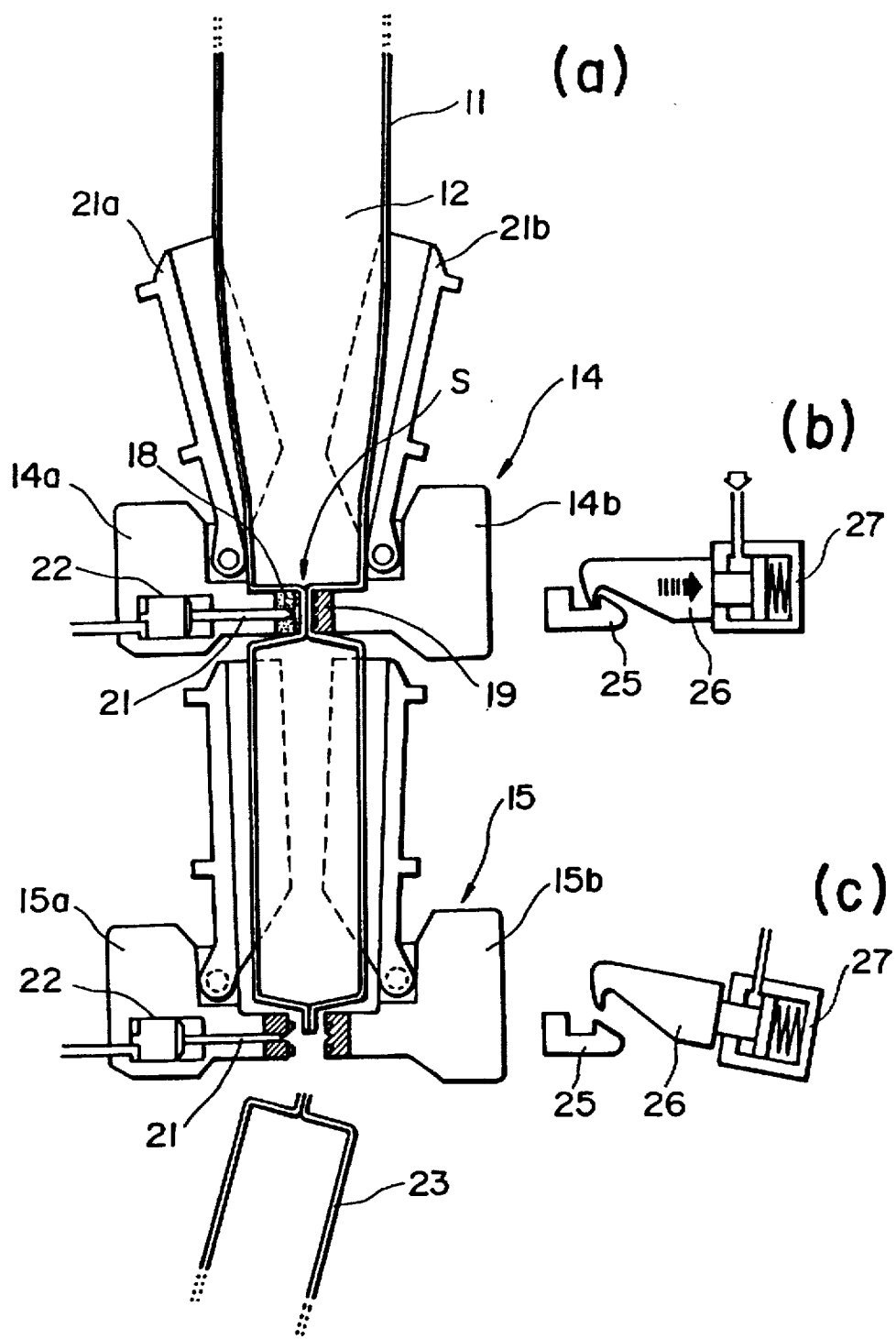
FIG. 4 is a schematic illustration showing the main part of an apparatus for filling according to an embodiment of the present invention.

FIG. 4 is a schematic illustration showing the main part of an apparatus for filling according to an embodiment of the present invention. FIG. 4(a) is a schematic illustration showing a forming unit, FIG. 4(b) is an illustration showing the engaged state of engaging members, and FIG. 4(c) is an illustration showing the disengaged state of engaging members.

In FIG. 4, the reference numeral 11 denotes a tube made of a flexible laminated material and formed by sealing a web-like packaging material in the longitudinal direction. The packaging material is laminated, for example, such that lamination layers thereof are in order of a polyethylene layer, a paper material and a polyethylene layer, from inside to outside, when a container is formed. The tube 11 extends upward and contains a drink 12 therein.

The tube 11 is continuously transferred downward, and squeezed and sealed in the lateral direction at predetermined intervals by two sealing/cutting units 14 and 15, for forming a strip-like sealed portion S. Then, the sealed portion S is cut to form a rectangular container 23 filled with a predetermined amount of the drink 12. For these operations, both of the sealing/cutting units 14 and 15 have cutting jaws 14a and 15a and heat sealing jaws 14b and 15b.

A cutting bar 18 is attached to the forward end of each of the cutting jaws 14a and 15a while a heat sealing bar 19 is attached to the forward end of each of the heat sealing jaws 14b and 15b. The cutting jaws 14a and 15a and the heat sealing jaws 14b and 15b are moved forward to squeeze the tube 11 from the both sides thereof to bring opposing inner surfaces of packaging materials in contact with each other and to form a lateral seal.

At the center of the cutting jaws 14a and 15a, a flat cutter 21 extending in the lateral direction is disposed in such a fashion as to be able to move forward and backward, and cuts the sealed portion S laterally at its center when the cutter moves forward. For moving the cutter 21 forward and backward, a cylinder 22 is attached to the backward end of the cutter 21, and an operating medium is fed to and ejected from the cylinder 21 for moving the cutter 21 forward and backward.

The reference numerals 21a and 21b denote a pair of forming flaps for enclosing and guiding the tube 11. The forming flaps are pivotably attached to the cutting jaws 14a and 15a and the heat sealing jaws 14b and 15b, and forms the tube 11 into a rectangle.

In FIG. 4, the sealing/cutting unit 14 is in the position of starting the sealing/cutting operation, where the cutting jaw 14a and the heat sealing jaw 14b are moved forward to squeeze the tube 11 from the both sides thereof for bringing opposing inner surfaces of packaging materials in contact with each other.

Then, the sealing/cutting unit 14 moves downward while holding the tube 11 squeezed. While the sealing/cutting unit is moving downward, the heat sealing bar 19 disposed at the forward end of the heat sealing jaw 14b and the cutting bar 18 disposed at the forward end of the cutting jaw 14a strongly press the portion to be sealed, and the heat sealing bar 19 generates heat to laterally seal the tube 11 for forming the sealed portion S.

In FIG. 4, the sealing/cutting unit 15 is in the position where the sealing/cutting operation is completed. Immediately before the sealing/cutting unit 15 reaches this position, the cutter 21 of the sealing/cutting unit 15 moves forward, and cuts the sealed portion S laterally at its center for separating the rectangular container 23 from the tube 11.

When the sealed portion S has been laterally cut at its center, the cutting jaw 15a and heat sealing jaw 15b of the sealing/cutting unit 15 are retracted, and then, swing upward to the position for starting the sealing/cutting operation. When the sealing/cutting unit 15 reaches the position for starting the sealing/cutting operation and begins to move the cutting jaw 15a and the heat sealing jaw 15b, the cutter 21 of the sealing/cutting unit 14 advances ahead to cut the sealed portion laterally at its center to separate the rectangular container 23 from the tube 11.

The reference numerals 25 and 26 denote a pair of engaging hooks which form an engaging member. The engaging hook 25 is attached to each of the cutting jaws 14a and 15a while another engaging hook 26 is attached to each of the heat sealing jaws 14b and 15b. A cylinder 27 is connected to each of the engaging hooks 26.

After the engaging hooks 25 and 26 are engaged with each other, an operating medium is supplied to the cylinders 27 for drawing the cutting jaws 14a and 15a and the heat sealing jaws 14b and 15b toward each other, thereby increasing a pressing force for sealing. In the position for starting the sealing/cutting operation, the engaging hooks 25 and 26 are engaged with each other as shown in FIG. 4(b) while in the position for finishing the sealing/cutting operation, the hooks are disengaged from each other as shown in FIG. 4(c).

The heat sealing bar 19 moves forward/backward in association with the forward/backward movement of the heat sealing jaws 14b and 15b, and at the same time, the cutting bar 18 also moves forward/backward in association with the forward/backward movement of the cutting jaws 14a and 15a. While moving forward, the heat sealing bar 19 and the cutting bar 18 squeeze and press the tube 11, and the heat sealing bar 19 generates heat to fuse a film, such as polyethylene or the like, formed on the surface of the tube 11 for sealing.

Figure 5:
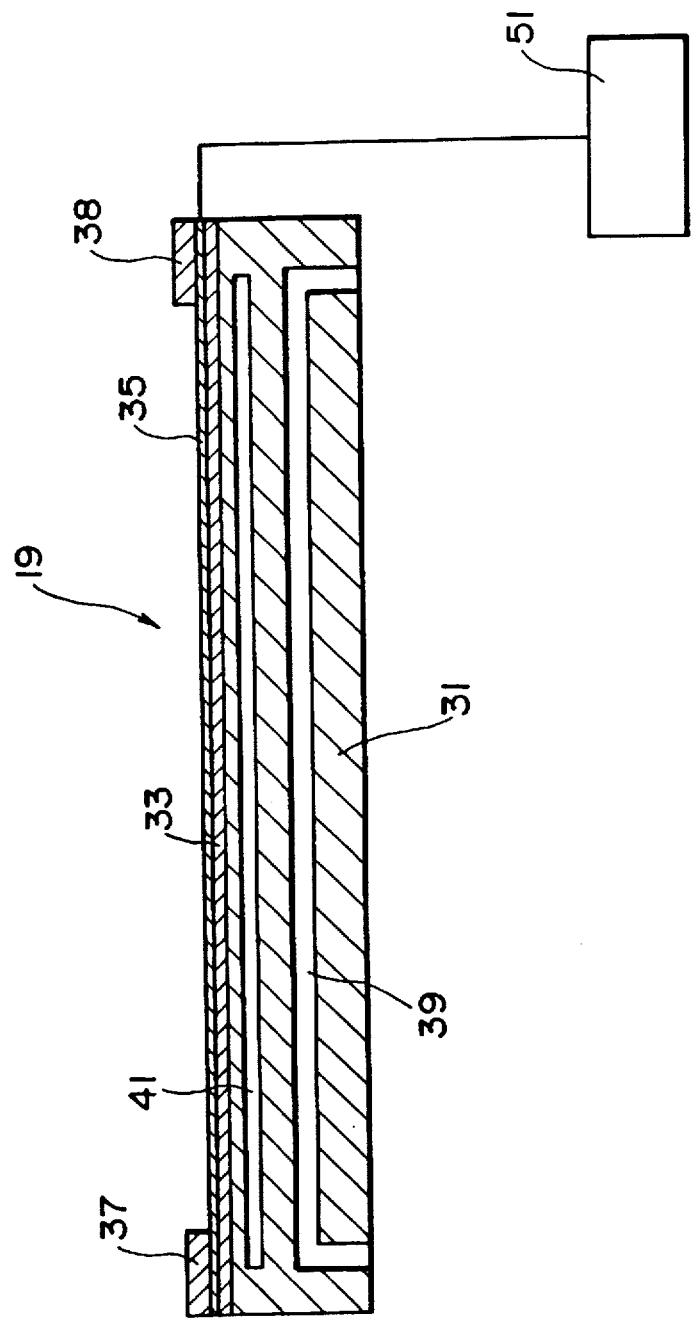
FIG. 5 is a cross-sectional view showing a heat sealing bar according to the embodiment of the present invention.

FIG. 5 is a cross-sectional view showing a heat sealing bar in an embodiment of the present invention.

Figure 1:
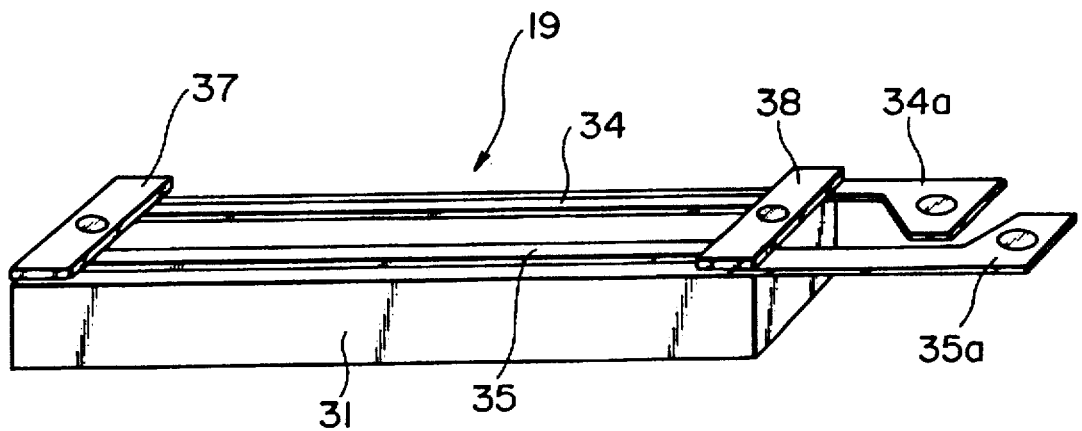
FIG. 1 is a perspective view showing a conventional heat sealing bar.
Figure 2:
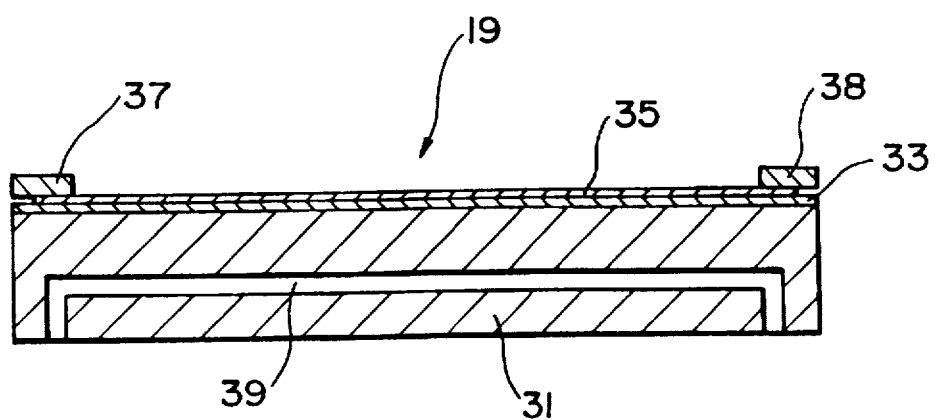
FIG. 2 is a cross-sectional view showing a conventional heat sealing bar.

In FIG. 5, the reference numeral 31 denotes a slender block-like bar body made of metal; the reference numeral 33 denotes an insulating layer made of chromium oxide formed on the surface of the bar body 31; the reference numeral 35 denotes a heating ribbon fixed on the surface of the insulating layer 33; the reference numerals 37 and 38 denote holders to secure the end portions of the heating ribbon 35 on the bar body; the reference numeral 19 denotes a heat sealing bar. On the far side of the heating ribbon 35, there is another heating ribbon 34 (see FIG. 1), not shown, fixed on the surface of the insulating layer 33. The heating ribbons 34 and 35 are formed with a strip-like ribbon of 0.2 mm in thickness made of nickel alloy. An unillustrated terminal is formed at one end of each of the heating ribbons 34 and 35, and the terminals are connected to a power unit 51 for supplying current in pulses to the heating ribbons 34 and 35. The heating ribbons 34 and 35 are connected to each other at another end of each of the ribbons by an unillustrated conductor. In the present embodiment, two parallel heating ribbons 34 and 35 are connected to each other by a conductor, but it is possible to integrate the two parallel heating ribbons 34 and 35 into a U-shaped ribbon.

As shown in FIG. 4(a), for sealing the tube 11 in the lateral direction, one pulse of current is supplied to the heating ribbons 34 and 35 to fuse a film, and then another short pulse is supplied for separating the packaging material from the heat sealing bar 19. Each pulse is generated at intervals of 500 ms.

The heating ribbons 34 and 35 are fixed on the insulating layer 33 by diffusing metal atoms into the layer. When the heating ribbons 34 and 35 are formed with a titanium-base activated metal and silver, the heating ribbons 34 and 35 can also be fixed on the insulating layer 33 by brazing.

After the heating ribbons 34 and 35 have been fixed on the insulating layer 33, the entirety thereof is coated with silicone to improve the corrosion resistance of the heating ribbons 34 and 35 and to facilitate separation of the packaging material from the heat sealing bar. Moreover, a cooling water passage 39 is formed in the bar body 31 in the longitudinal direction thereof for cooling the heat sealing bar 19.

Figure 3:
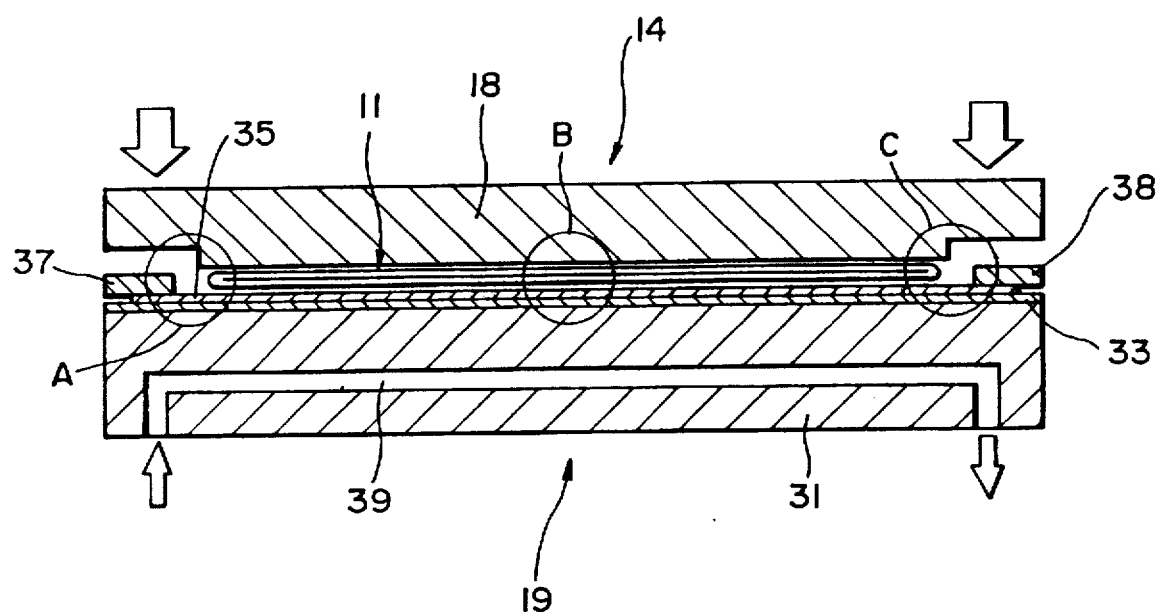
FIG. 3 is a schematic illustration showing a conventional sealing/cutting unit.

The heating ribbons 34 and 35 fixed on the bar body 31 extend substantially over the entirety of the heat sealing bar 19 in the longitudinal direction, and generate heat uniformly over the entire area of the heating ribbons 34 and 35. The width of the tube 11 squeezed between the cutting bar 18 and the heat sealing bar 19 is smaller than the length of the heating ribbons 34 and 35. Therefore, there is no heat transfer to the tube 11 at the opposite end portions A and C of the heating ribbons 34 and 35 (see FIG. 3) when the tube 11 is sealed.

Also, there exists a longitudinally sealed portion (a portion formed by sealing the web-like packaging material in the longitudinal direction) at the center of the tube 11. The packaging material on the sealed portion forms a 3-layer structure, and consequently, the 3-layer portion is thicker than the rest of the tube 11, and also is lower in thermal conductivity because of the presence of a film provided for improving the gas barrier property. As a result, a central portion B of each of the heating ribbons 34 and 35 has less heat transfer to the tube 11 than the rest of the heating ribbons.

As stated above, there exist three different kinds of thermal loads in the heating ribbons 34 and 35. In this connection, a heat pipe 41 is embedded in the bar body 31 adjacent the insulating layer 33 so as to extend along the heating ribbons 34 and 35 in the longitudinal direction of the heat sealing bar 19.

The heat pipe 41 transfers heat longitudinally of the heat sealing bar 19 from a portion of a small thermal load to a portion of a larger thermal load, thereby holding the entirety of the heat sealing bar uniform in temperature. In other words, a part of heat generated at the opposite ends A and C and central portion B of the heating ribbons 34 and 35 transfers to other portions operating with a larger thermal load. Accordingly, the opposite ends A and C and central portion B of the heating ribbons 34 and 35 remain in the same temperature range as that of the rest of the heating ribbons.

As stated above, the heating ribbons 34 and 35 expand uniformly over the entirety thereof, and there never occurs the phenomenon of an inconsistency in expansion between the heating ribbons 34 and 35 and the insulating layer 33. As a result, there never occurs a distortion of the insulating layer 33, and the heating ribbon is free from breakage caused by the recurrence of distortion.

The present invention is not limited to the above-mentioned embodiment, and the embodiment may be modified in various forms without departing from the spirit and scope thereof.

I claim:

1. A heat sealing bar for mounting transverse to a tube formed by sealing a web-line packaging material in a longitudinal direction, and for forming a seal laterally across the tube, said heat sealing bar comprising:

(a) a slender block-like bar body;

(b) an insulating layer formed on a surface of said bar body;

(c) a flat heating ribbon fixed on a surface of said insulating layer along the entire length of said bar body and means for supplying a pulse of electric current to said heating ribbon to thereby generate heat within the heating ribbon; and (d) cooling means for cooling said heat sealing bar;

(e) heat pipe means, including a heat pipe embedded in said bar body between said insulating layer and said cooling means and extending longitudinally along said heating ribbon, for transferring heat longitudinally in said heating ribbon from a portion of said heating ribbon operating under small thermal load to a portion of said heating ribbon operating under a larger thermal load.

2. A heat sealing bar according to claim 1, wherein said bar body is made of metal.

3. A heat sealing bar according to claim 1, wherein said insulating layer is made of chromium oxide.

4. A heat sealing bar according to claim 1, wherein said heating ribbon is made of nickel alloy.

* * * * *